United States Patent
Songen

(10) Patent No.: US 7,451,737 B2
(45) Date of Patent: Nov. 18, 2008

(54) POWERTRAIN OF AN INTERNAL COMBUSTION ENGINE WITH PISTON AND CONNECTING ROD

(75) Inventor: Matthias Songen, Augsburg (DE)

(73) Assignee: MAN Diesel SE, Augsburg (DE)

( * ) Notice: Subject to any disclaimer, the term of this patent is extended or adjusted under 35 U.S.C. 154(b) by 353 days.

(21) Appl. No.: 11/001,194

(22) Filed: Dec. 1, 2004

(65) Prior Publication Data

US 2005/0139188 A1 Jun. 30, 2005

(30) Foreign Application Priority Data

Dec. 2, 2003 (DE) .............................. 103 56 200

(51) Int. Cl.
*F01B 31/10* (2006.01)
*F02B 75/32* (2006.01)

(52) U.S. Cl. ..................... 123/197.3; 74/579 R; 92/157

(58) Field of Classification Search ............. 123/197.1, 123/197.2, 197.3; 74/579 R; 92/157
See application file for complete search history.

(56) References Cited

U.S. PATENT DOCUMENTS

| | | | |
|---|---|---|---|
| 2,830,860 A | * | 4/1958 | Sampietro .................... 403/25 |
| 4,073,220 A | * | 2/1978 | Guenther ..................... 92/190 |
| 4,253,430 A | * | 3/1981 | Garter et al. ............. 123/41.38 |
| 4,270,494 A | * | 6/1981 | Garter et al. ............. 123/41.35 |
| 4,662,319 A | * | 5/1987 | Ayoul ....................... 123/41.35 |
| 4,858,566 A | * | 8/1989 | Paul et al. ................ 123/41.35 |
| 5,121,722 A | * | 6/1992 | Horiuchi ..................... 123/276 |
| 5,413,074 A | * | 5/1995 | Horiuchi .................. 123/197.2 |

FOREIGN PATENT DOCUMENTS

| | | |
|---|---|---|
| DE | 749285 | 11/1944 |
| FR | 1083390 | 1/1955 |
| JP | 2000-337506 A | 12/2000 |
| JP | 2000337506 A * | 12/2000 |

* cited by examiner

*Primary Examiner*—Noah Kamen
(74) *Attorney, Agent, or Firm*—Leydig, Voit & Mayer, Ltd.

(57) ABSTRACT

A powertrain for an internal combustion engine having a connecting rod with a piston supported at one end which is adapted for easy assembly and disassembly without expensive tools. The piston is supported on the connecting rod by a universal joint defined by a spherical surface of an integral connecting rod end and an end plate of the piston having a correspondingly configured spherical recess. The connecting rod end is formed with flat surfaces on opposed sides for engagement by releasable securement members which maintain the piston in proper seated position on the connecting rod during normal usage, but which are releasable to permit removal of the piston upon rotation of the connecting rod 90° about its longitudinal axis.

2 Claims, 6 Drawing Sheets

POWERTRAIN OF AN INTERNAL COMBUSTION ENGINE WITH PISTON AND CONNECTING ROD

FIELD OF THE INVENTION

The present invention relates generally to powertrains for internal combustion engines, and more particularly, to an improved connecting rod and piston arrangement for use in such engines.

BACKGROUND OF THE INVENTION

The connecting rod of internal combustion engines typically consist of a connecting-rod shank and two end bearings, which link the piston and the corresponding crank pin of a crankshaft to a powertrain. One end performs oscillating motions, the other moves with the crank pin in the crank circle, so that a so-called "violin-shaped connecting rod," i.e., a violin-shaped motion curve of the connecting rod, is created.

From DE 35 05 964 C1, a powertrain with a connecting rod is known, which comprises, in a typical way, an end bearing in the form of a connecting-rod head, i.e., the upper connecting-rod eye, a connecting-rod shank, and an opposite end bearing in the form of the connecting-rod bearing, i.e., the lower connecting-rod eye. Such an arrangement represents a connecting-rod element between the straight part of a crank drive, thus to the piston, and the crankshaft. The connecting-rod head can be complete or in parts. The bearing cover of the divided connecting-rod bearing, thus of the lower connecting-rod eye, is connected to the connecting-rod foot by at least two fitted strain screws. The connecting-rod bearing is formed by the connecting-rod foot and connecting-rod cover, in which bearing shells expand into a complete bearing sleeve. In addition, such connecting-rod bearing receives the crank pin and associated impact-like stresses when the pressure changes, which produce high bearing loads. Because the connecting rod must be guided partially through the engine cylinder when the piston is assembled, at least for a strong crank pin the lower connecting-rod eye or the connecting-rod shank generally had to be divided.

The piston operates under great mechanical and thermal loads. At the same time it must perform several tasks, such as the conversion of pressure energy into mechanical work, sealing of the cylinder chamber from the crankcase, and straight guidance of the upper end of the connecting rod in so-called trunk piston engines. The bearing of the piston on the connecting-rod head has included a piston bolt in the connecting-rod eye, which transferred the forces evenly between piston and connecting rod. Previously, the position of the piston bolt had been determined by two factors. To prevent tipping motions of the piston, its center of gravity should lie on the axis of the bolt. On the other hand, the piston bolt must be fixed in the center of the shaft of the piston so that the normal force is transferred uniformly to the cylinder wall. Because both demands cannot be satisfied simultaneously, the piston bolt previously had been installed slightly above the center of the shaft.

Large pistons of a known type have been made of two or more parts. Thus, the piston base, e.g., made from steel or case iron, is screwed together with the shaft, e.g., made from special cast iron or an aluminum alloy.

From DE 100 46 214 C1, a powertrain is further known, for which a connecting rod is used in the form of a marine head with a one-part connecting-rod shank (which means savings in terms of weight and cost, compared with a connecting-rod shank divided for assembly reasons), which features a special configuration of connecting-rod bearing for receiving the crank pin, and thus enables a compact construction. For this reason, a smaller overall engine height also is possible and the drawing of the piston through the engine cylinder is eased considerably.

Now there is also the need to optimize the bearing of the piston on the connecting-rod head, which had been effected previously by means of a piston bolt, which transfers the forces between the piston and the connecting rod and the connecting-rod eye. In particular, there is the need to form this piston/connecting-rod connection more compactly and to make the piston assembly even simpler.

OBJECTS AND SUMMARY OF THE INVENTION

Starting with the foregoing background, it is an object of the present invention to provide a powertrain with an improved bearing for the piston on a connecting-rod head.

Another object is to provide a powertrain as characterized above in which piston assembly and disassembly is possible without expensive tools.

A further object is to provide a powertrain of the above kind which is lighter in weight and which can be more economically produced.

In carrying out the invention, the powertrain has a ball bearing/universal ball joint which permits elimination of a piston bolt typically required of the prior art, which substantially reduces oscillating mass. Instead, release of the bearing can be effected by turning the piston about its axis before permitting the piston to be drawn from the engine block without the connecting rod. Hence, division of the connecting rod shank also can be eliminated without necessity for realizing the specially configured connecting rod bearing according to DE 100 46 214 C1. Hence further weight reduction and cost savings can be obtained, as well as lower dynamic operating forces.

Other objects and advantages of the invention will become apparent upon reading the following detailed description and upon reference to the drawings, in which:

Figure 1:
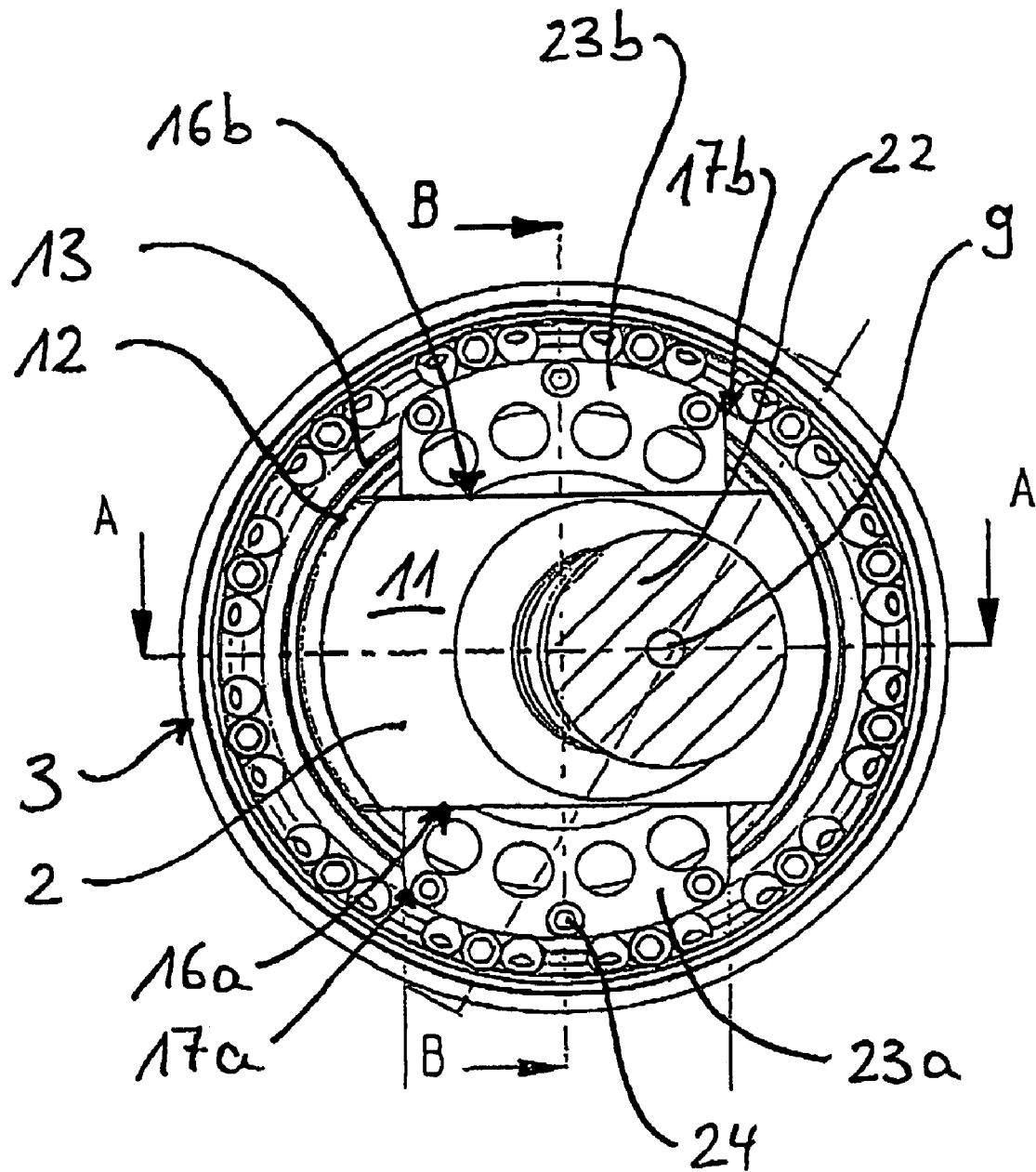
FIG. 1 is a top view of a ball bearing/universal ball joint in accordance with the invention.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF PREFERRED EMBODIMENT

Figure 4:
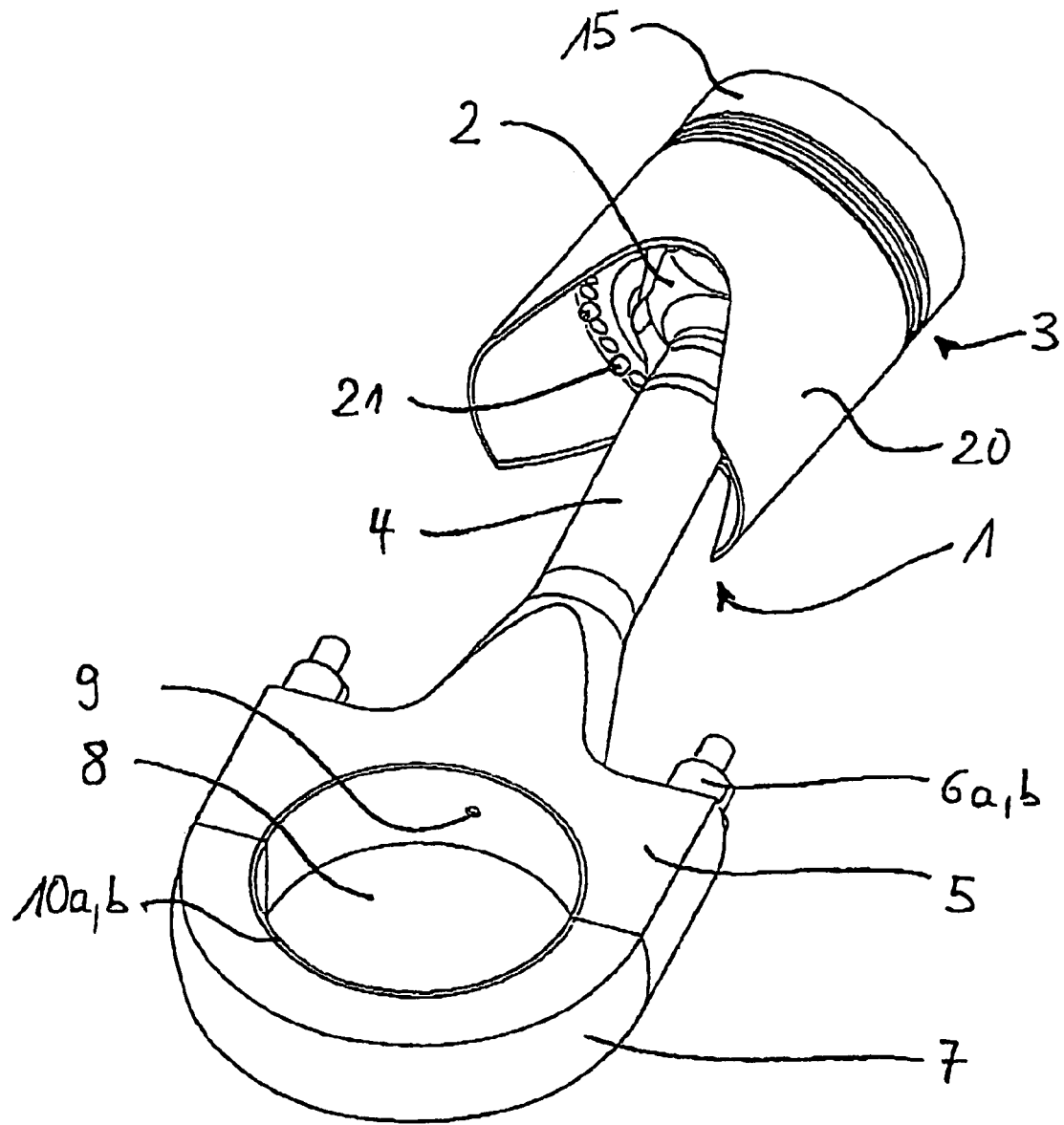
FIG. 4 is a perspective of a powertrain with a bearing arrangement on the piston rod in accordance with the invention.
Figure 5:
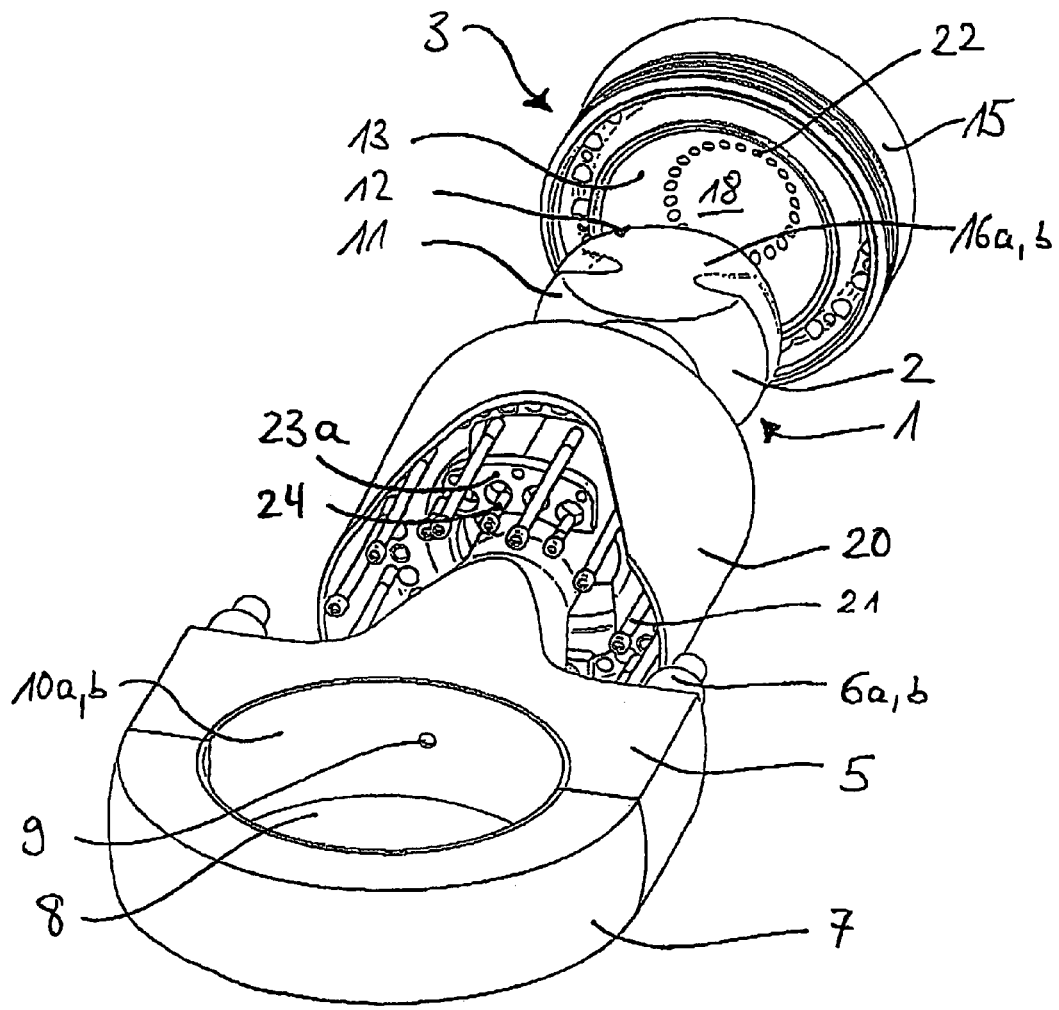
FIG. 5 is another perspective of the marine head shown in FIG. 3, wherein for unlocking the piston shaft from the piston base, a connecting-rod head, i.e., the universal ball joint, is shown removed from the piston base, i.e., from the end plate.

Referring now more particularly to the drawings, there is shown an illustrative powertrain in accordance with the invention which includes a connecting-rod 1 having a unitary or undivided connecting-rod head 2 extending at one end of a connecting-rod shank 4 having a piston 3 supported thereon and a connecting-rod foot 5, as depicted in FIGS. 4 and 5, at the other end of the shank 4 for connection to the crankshaft of a power driven engine. The connecting-rod foot 5 in this case has a connecting-rod cover 7 fixed to the foot 5 by means of tension screws 6a to form a lower crankshaft receiving connecting-rod eye 8. The connecting-rod eye 8 in this instance has two bearing shells 10a, 10b which expand into a complete bearing sleeve that surrounds the crank shaft and retains a crank pin in rotatable sliding contact. For lubricating the connecting-rod head 2 and for also cooling the piston, the connecting-rod shank 4 has an axial oil bore hole 9 drilled lengthwise through the shank for communication with a lubrication distribution system 22 that opens at the connecting-rod head 2.

Figure 2:
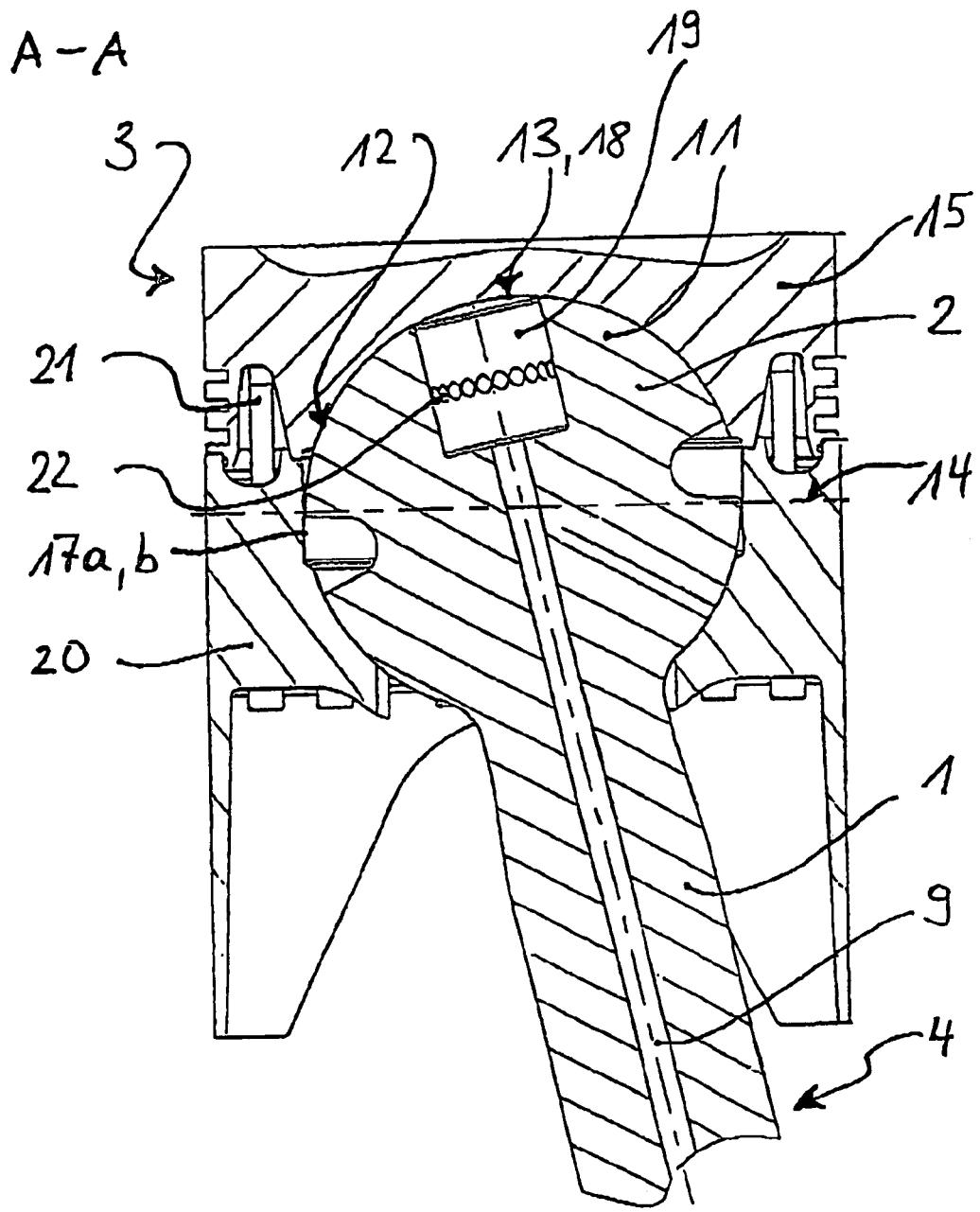
FIG. 2 is a fragmentary longitudinal section, taken in the plane of line A-A in FIG. 1, of a marine head with an undivided connecting-rod shank and ball bearing/universal ball joint in accordance with the invention.
Figure 3:
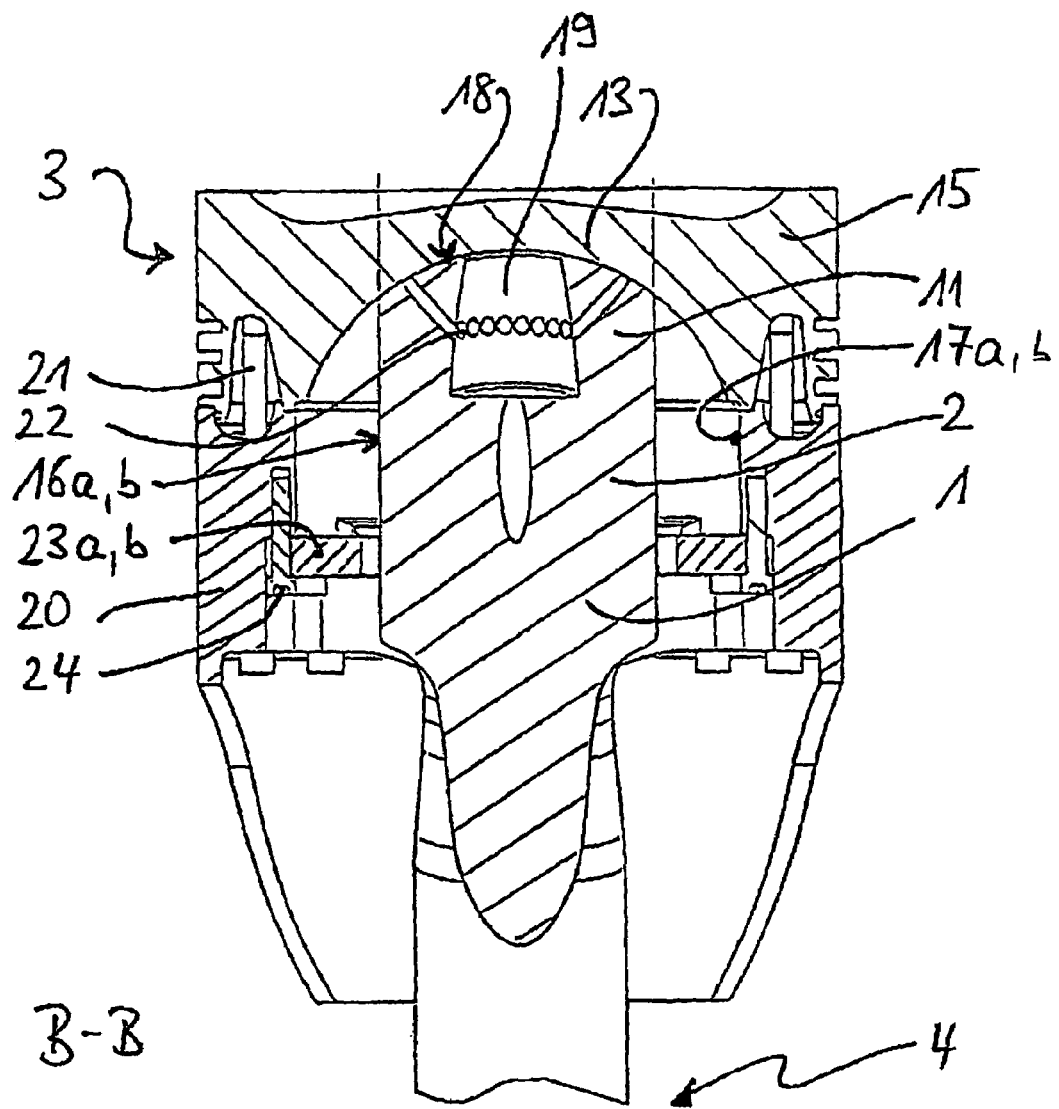
FIG. 3 is a fragmentary section of the marine head taken in the plane of line B-B in FIG. 1, turned 90° with reference to FIG. 2.

The bearing support of the piston 3 on a connecting-rod head 2 includes a universal ball joint part 11 which has a spherical bearing surface 12 on its outer periphery. Opposite the outer connecting-rod head bearing surface 12 is a correspondingly spherical bearing seat formed in a end plate 13 which axially retains the universal ball joint part 11 while permitting relative pivotal movement about a universal ball joint center relative to the end plate. As depicted in FIG. 2, the bearing surface defined by the outer spherical periphery 12 of the universal ball joint part 11 extends on both sides of a universal ball joint center plane 14 that extends through the points of the universal ball joint part at its greatest diameter. In the preferred embodiment, the connecting-rod head 2 is configured as the spherical universal ball joint part 11 and the end plate 13 forms base or end 15 of the piston, which is configured with the spherical bearing seat reverse the configuration of the ball joint part 11. The piston in this case, as depicted in FIG. 2, has a two part construction consisting of a top part or piston base 15 and a bottom part or piston shaft 20. Alternatively a piston could be formed in three parts in a known manner, consisting of a piston cap, piston shroud, and piston bottom part. Piston base 15 and piston shaft 20 in this case are connected to each other by appropriate fastening screws 21.

In the illustrated embodiment, as depicted in FIG. 1, the bottom part 20 of the piston 3 has an interior adapted for receiving the connector rod head 2 adjacent the bearing seat defined by the end plate 13. The connecting-rod head 2 and the piston define at least two recesses 17, 18 on diametrically opposed sides of the connecting-rod head 2.

Figure 6:
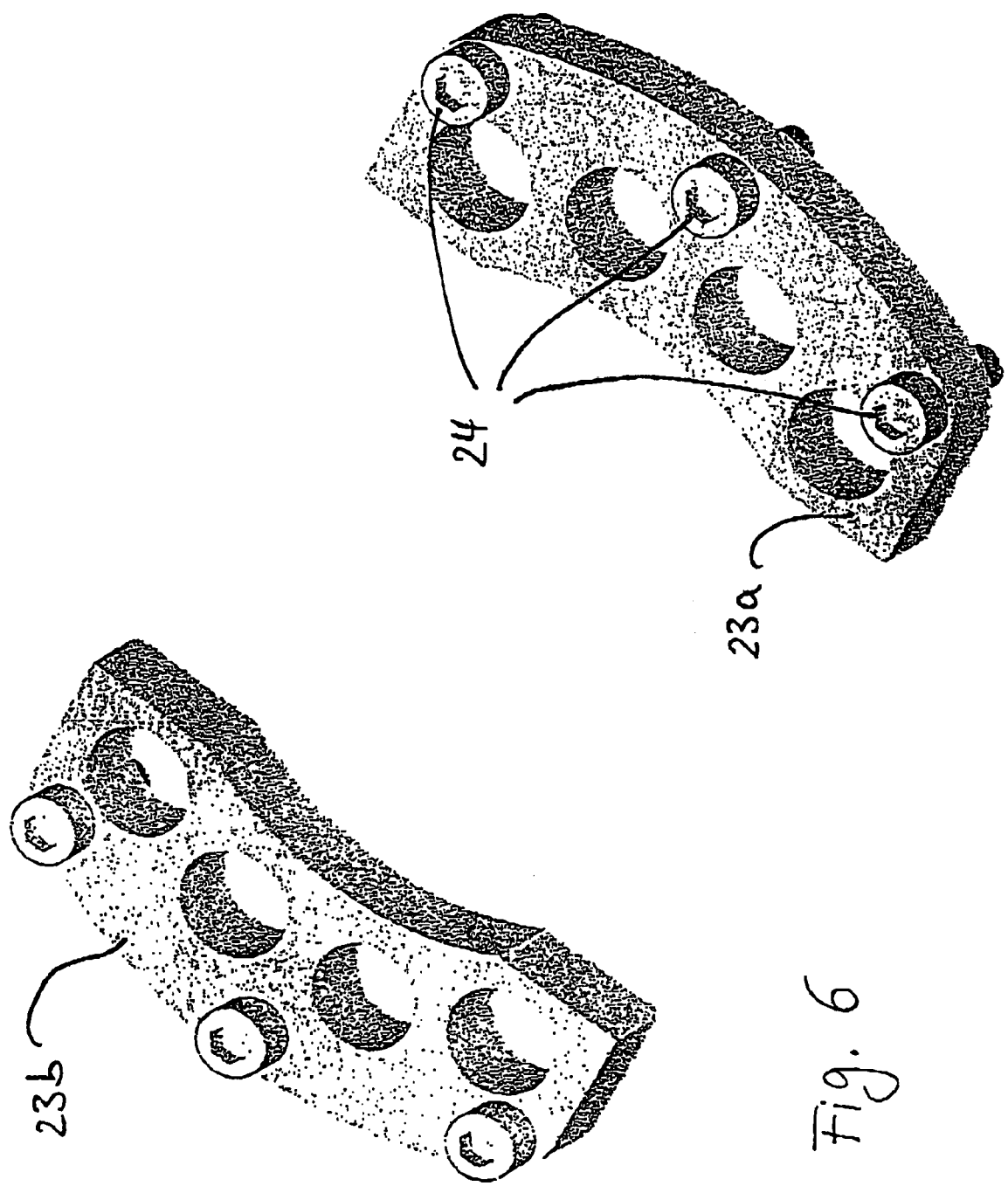
FIG. 6 is a perspective of the rotational securing means for maintaining a positive lock on the ball bearing/universal joint according to the invention.

In carrying out the invention, rotational securement element 23a, 23b are respectively disposed within the recesses 17a, 17b on opposed sides of the connecting-rod head 2, as depicted in FIG. 6, and are fixed within the piston bottom part 20 by screws 24. The spherical universal ball joint 11, defined by the spherical connecting-rod head 2, is formed with a pair of flattened wall sections 16a, 16b which are retained by the rotational securement elements 23a, 23b to prevent relative rotation of the piston and connecting-rod head about a long axis of the connecting-rod. The rotational securement members 23a, 23b therefore each can be fixed within the piston by means of the screws 24 when in assembled position occupying the recesses 17a, 17b on opposite sides of the connecting-rod head 2, or they can be released to permit removal of the piston as will become apparent. To ensure reliable permanent lubrication of the ball bearing/universal ball joint 11, 13 a lubricating reservoir is provided in front of the spherical surface 18 of the end plate 13 which can be appropriately sealed on the engine side.

Thus, consistent with an important feature of the invention, a ball bearing/universal ball joint 11, 13 is provided that has a bearing body 11 formed with a spherical outer surface 12 immersed in a lubricating means and held against an annular or partially spherical surface at its axially end in the pot-like recess of the end plate 13 and the separation of the connecting-rod 1 from the piston 3 can be effected simply by removal of the rotational securement elements 23a, 23b for allowing rotation of the piston 3 relative to the connecting-rod by 90°, which permits positioning of the spherical surfaces of the connecting-rod head into the recesses 17a, 17b and the flattened wall sections 16a, 16b of the connecting-rod head opposite the spherical surfaces of the end plate so that separation of the positive lock of the ball bearing/universal ball joint 11, 13 is effected and the piston can be easily removed from the connecting-rod head 2.

The configuration of the ball bearing/universal ball joint 11, 13 according to the invention further improves the direct gas-force transmission to the connecting-rod shank 4. The previously used piston bolt deployed in such connecting rod arrangements can be eliminated. Hence, the oscillating mass of the connecting rod is reduced significantly, as much as 20%, and frictional resistance also becomes smaller overall.

It will also be appreciated that division of the connecting rod shank into multiple components is no longer necessary, because drawing of the piston 3 through the engine cylinder can now take place in a simple way when the connecting rod is completely detached. Further savings are achieved by reason of reduced weight and cost. The piston disassembly also can be performed without expensive or hydraulic tools. Thus a small overall piston height further can be achieved.

What is claimed is:

1. A powertrain for an internal combustion engine having a crankshaft comprising:

an elongated connecting rod (1) having a piston (3) at one end and having an opposite end formed with an eye (8) for connection to the crankshaft;

a piston support bearing at said one connecting rod end in the form of a universal ball joint (11), (13);

said universal ball joint (11) being defined by a spherical surface (12) on said one connecting rod end and a corresponding spherical surface of an endplate (13) that provides axial support for said connecting rod, the spherical surface of said one connecting rod end being immersed in a lubricant and the end plate forming an outer end member of said piston;

said universal ball joint (11), (13) including releasable securement members (23a, 23b) for maintaining said spherical surfaces in operable mating relation to each other during operation of said powertrain and for preventing rotational movement of said connecting rod about a longitudinal elongated axis of the connecting rod;

recesses defined between said piston and said one connecting rod end, said securement members each being disposed in a respective one of said recesses, said recesses being on diametrically opposed sides of said one connecting rod end, said one connecting rod end being formed with flattened wall surfaces facing said recesses for engagement by respective ones of said securement members when in an assembled state; and said securing members (23*a*, 23*b*) being releasable to permit separation of said spherical surfaces and removal of said piston rod from said piston upon rotation of the connecting rod about its longitudinal axis.

2. The powertrain of claim 1 including a lubrication system for said spherical bearing surfaces which includes an oil bore hole (9) in a shank of said connecting rod that communicates with a reservoir (19) at said end plate (13).

* * * * *